United States Patent
Sigler et al.

(10) Patent No.: US 7,451,907 B2
(45) Date of Patent: *Nov. 18, 2008

(54) ROLL BONDING OF BIPOLAR PLATES

(75) Inventors: David R. Sigler, Shelby Township, MI (US); Xiaohong Gayden, West Bloomfield, MI (US); Yen-Lung Chen, Troy, MI (US)

(73) Assignee: General Motors Corporation, Detroit, MI (US)

( * ) Notice: Subject to any disclaimer, the term of this patent is extended or adjusted under 35 U.S.C. 154(b) by 314 days.

This patent is subject to a terminal disclaimer.

(21) Appl. No.: 10/913,690

(22) Filed: Aug. 6, 2004

(65) Prior Publication Data

US 2006/0027634 A1 Feb. 9, 2006

(51) Int. Cl.
*B23K 31/02* (2006.01)
(52) U.S. Cl. ............. 228/157; 228/245; 228/235.2
(58) Field of Classification Search ........... 228/235.2, 228/115, 3.1, 901; 29/890.041, 890.042
See application file for complete search history.

(56) References Cited

U.S. PATENT DOCUMENTS

| | | | | |
|---|---|---|---|---|
| 2,906,006 A | * | 9/1959 | Neel | 29/890.041 |
| 3,927,817 A | * | 12/1975 | Hamilton et al. | 228/157 |
| 4,820,355 A | * | 4/1989 | Bampton | 148/535 |
| 5,069,383 A | * | 12/1991 | Cooper et al. | 228/157 |
| 5,322,740 A | * | 6/1994 | Ghosh | 428/649 |
| 5,643,690 A | * | 7/1997 | Tateishi et al. | 429/34 |
| 5,683,828 A | * | 11/1997 | Spear et al. | 429/13 |
| 5,858,567 A | * | 1/1999 | Spear et al. | 429/12 |
| 6,051,331 A | * | 4/2000 | Spear et al. | 429/34 |
| 6,450,396 B1 | * | 9/2002 | Krajewski | 228/193 |
| 7,128,536 B2 | * | 10/2006 | Williams et al. | 416/229 R |
| 2005/0133568 A1 | * | 6/2005 | Sigler et al. | 228/157 |
| 2005/0133575 A1 | * | 6/2005 | Gayden et al. | 228/235.2 |

FOREIGN PATENT DOCUMENTS

EP 229954 A2 * 7/1987
JP 405212562 A * 8/1993

OTHER PUBLICATIONS

U.S. Appl. No. 10/738,402, filed Dec. 17, 2003 entitled "Bipolar plate fabrication by roll bonding", Xiaohong Gayden, et al.
U.S. Appl. No. 10/738,481, filed Dec. 17, 2003 entitled "Bipolar Plate Fabrication", Xiaohong Gayden, et al.

* cited by examiner

*Primary Examiner*—Kiley Stoner (57) ABSTRACT

A current collector plate, also called a bipolar plate, for a fuel cell includes two facing metal sheets with fluid channels for the fuel (often hydrogen) on the non-facing side of one sheet and fluid channels for air on the non-facing side of the other sheet. Such a plate is made by applying a patterned coating of particles of a soft and reactive metal to at least one of the sheets and rolling them together so that the soft metal particles deform and interact with the facing sheets to selectively join them at the patterned areas. Pressurized fluid is introduced between the sheets to expand non-bonded portions and define the fluid channels.

6 Claims, 6 Drawing Sheets

ROLL BONDING OF BIPOLAR PLATES

TECHNICAL FIELD

This invention pertains to the manufacture of pairs of joined bipolar plates that are shaped to define a pattern of fluid flow channels on their external and facing surfaces. More specifically, this invention pertains to the use of a relatively soft conductive material in roll bonding selected portions of the plates before expanding portions to produce the flow channels.

BACKGROUND OF THE INVENTION

Fuel cells that electrochemically combine hydrogen and oxygen are presently being developed and used for production of electric power in stationary and automotive applications. These power sources are assemblies of a stack of individual cell elements to deliver a power requirement at a specified voltage. The heart of a cell is a membrane electrolyte and electrode assembly (MEA) comprising, for example, a solid polymer, proton exchange electrolyte membrane with a porous catalytic anode on one side of the electrolyte membrane and a porous catalytic cathode on the other side of the membrane. In an assembly of many such cells, each pair of MEAs is separated by a current collector sheet, sealing gasket, and a current collector plate, sometimes called a bipolar plate.

The bipolar plate comprises two thin, facing metal sheets that are shaped to define a flow path on the outside of one sheet for delivery of fluid fuel, for example hydrogen gas, to the anode of one MEA and a flow path for oxygen, often air, on the outside of the second sheet to the cathode side of another MEA on the opposite side of the plate. When the sheets are joined, the surfaces facing between them accommodate the flow of a dielectric cooling fluid. The plates are made of a formable metal that provides suitable strength, electrical conductivity and resistance to corrosion. Stainless steel sheets (316L alloy) of about 0.1 mm gage are an example of a suitable material.

The manufacture of such bipolar plates has been complex and expensive. In one procedure, the metal plate pairs are separately stamped to form the respective fuel and oxidant flow passages and carefully assembled for joining such as by brazing to form a hermetic seal between the two plates. It has also been proposed to roll bond unformed metal sheets using a stop-off or anti-bonding material in areas where the flow passages are to be formed. After roll bonding, which significantly deforms the sheets, a pressurized fluid is introduced between them to expand non-bonded surfaces into suitable flow passages on both the facing and non-facing sides of the sheets. This practice is somewhat simpler than stamping, aligning, and brazing the sheets, but the roll bonding tends to significantly thin the sheets and enlarge their area, and allowance must be made to achieve the desired shape of the bipolar plate for fitting into the fuel cell stack.

It is an object of this invention to provide a simpler method, utilizing a version of roll bonding for fabricating bipolar plates. It is a further object of the invention to provide a method of fabricating bipolar plates that utilizes a pattern of soft bonding material for the metal sheets and lower roll bonding force.

SUMMARY OF THE INVENTION

In accordance with the process of this invention, plain metal sheets are rolled together to bond selected facing portions and then non-bonded portions are expanded to make a bipolar plate. A pattern of relatively soft metallic particles are applied to at least one of the metal sheets in the portions of the facing surfaces to be bonded. Roll-bonding pressure is then applied as necessary to deform the soft bonding material into intimate contact with the selected regions of the sheets and with some deformation of the sheets.

Sheet metal material is selected for the bipolar plate application, such as thin gage 316L stainless steel. Designs for the respective fuel and oxidant flow passages on separate sheets are made with the understanding that the opposite sides of these flow passages will serve as coolant flow passages between the joined sheets. A soft metal bonding material, such as particles of aluminum, is selected for joining the sheets of the bipolar plate. The aluminum particles may contain small amounts of impurities or alloying elements but they are to be softer than the plate material and inexpensive. Aluminum is also known to be chemically reactive with respect to ferrous alloys. Under the energy of roll bonding, aluminum atoms in the strategically placed, deformed particles can react with the iron-containing surfaces pressed on them to form intermetallic compounds that increase bonding strength of the roll bonded interface.

Thus, a coating of the soft metal, suitably in particle form, is applied in a bonding pattern on one side of blank stainless sheet material. Since fluid conduits are to be formed in the outward faces of the sheets the pattern of bonding material will typically be applied in lines or strips. Suitable masking for pattern definition may be used and the bonding material applied by spraying, painting, printing or the like on at least one of the sheets to be joined in the fabrication of the bipolar plate. The soft particulate metal may be mixed with a transient liquid vehicle, such as water, for ease of application.

Following application of the soft metal bonding material, facing sheets are passed between rollers that press the sheets over the patterned area. The rolling pressure is sufficient to deform the soft particles into intimate bonding contact at selected locations between the facing sheets. But a purpose of using the soft metal bonding material is to deform it without excessive deformation of the bipolar sheets. And, as stated, when the soft material is suitably reactive with the facing sheet material additional chemical bonding may occur.

Following the patterned bonding between the sheets, and any other stamping, cutting, trimming or like preparatory operation, pressurized fluid is introduced at one or more locations between non-bonded surface portions of the facing sheets. Preferably, the bonded sheets are placed between facing die members to define the shape of outward faces of the sheets as they are expanded by the fluid pressure. One or more suitable nozzles inserted at non-bonded locations on sides of the facing sheets may be used to introduce pressurized fluid, for example water or nitrogen, between the sheets now sealed between the facing die members.

When the selectively bonded, facing sheets have been expanded to define external fuel and oxidant passages, and internal coolant passages, they are removed from the shaping dies. Any trimming and other fabricating or finishing operations are then performed. Generally, it is preferred that the exposed surfaces of the sheets have a coating of a conductive material to increase electrical conductivity. Such a coating material may be applied to the blank sheets prior to forming or at a suitable later stage in the making of the bipolar plates.

Other objects and advantages of the invention will become apparent from a description of a preferred embodiment of the invention which follows.

DESCRIPTION OF PREFERRED EMBODIMENTS

Figure 1:
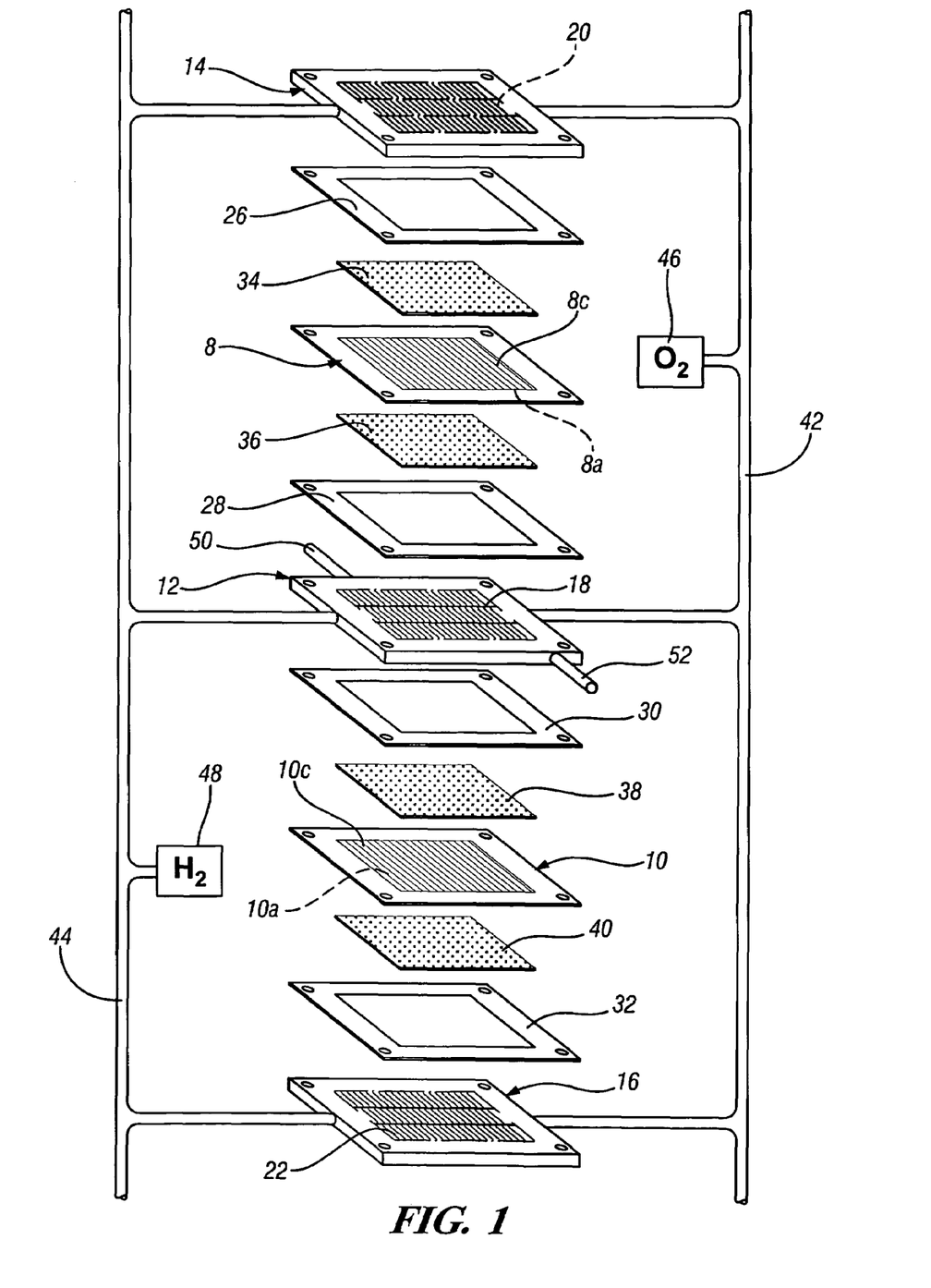
FIG. 1 is an isometric exploded illustration of a fuel cell stack.

FIG. 1 schematically depicts a representative partial fuel cell stack having a pair of membrane-electrode-assemblies (MEAs) 8 and 10 separated from each other by a non-porous, electrically-conductive bipolar plate 12. Each of the MEAs 8, 10 have a cathode face 8c, 10c and an anode face 8a, 10a. The MEAs 8 and 10, and bipolar plate 12, are stacked together between non-porous, electrically-conductive, liquid-cooled bipolar plates 14 and 16. The bipolar plates 12, 14 and 16 each include flow fields 18, 20 and 22 having a plurality of flow channels formed in the faces of the plates for distributing fuel and oxidant gases (e.g., $H_2$ and $O_2$) to the reactive faces of the MEAs 8 and 10. Nonconductive gaskets or seals 26, 28, 30 and 32 provide a seal and electrical insulation between the several plates of the fuel cell stack.

Porous, gas permeable, electrically conductive sheets 34, 36, 38 and 40 press up against the electrode faces of the MEAs 8 and 10 and serve as primary current collectors for the electrodes. Primary current collectors 34, 36, 38 and 40 also provide mechanical supports for the MEAs 8 and 10, especially at locations where the MEAs are otherwise unsupported in the flow field. Suitable primary current collectors include carbon/graphite paper/cloth, fine mesh noble metal screens, open cell noble metal foams, and the like which conduct current from the electrodes while allowing gas to pass through.

Bipolar plates 14 and 16 press up against the primary current collector 34 on the cathode face 8c of MEA 8 and the primary current collector 40 on the anode face 10a of MEA 10. The bipolar plate 12 presses up against the primary current collector 36 on the anode face 8a of MEA 8 and against the primary current collector 38 on the cathode face 10c of MEA 10. An oxidant gas such as oxygen or air is supplied to the cathode side of the fuel cell stack from a storage tank 46 via appropriate supply plumbing 42. Similarly, a fuel such as hydrogen is supplied to the anode side of the fuel cell from a storage tank 48 via appropriate supply plumbing 44. In a preferred embodiment, the oxygen tank 46 may be eliminated, and air delivered to the cathode side from the ambient. Likewise, the hydrogen tank 48 may be eliminated and hydrogen supplied to the anode side from a reformer which catalytically generates hydrogen from methanol or a liquid hydrocarbon (e.g., gasoline). Exhaust plumbing (not shown) for both the $H_2$ and $O_2$/air sides of the MEAs is also provided for removing $H_2$ depleted anode gas from the anode flow field and $O_2$ depleted cathode gas from the cathode flow field. Coolant plumbing 50 and 52 is provided for supplying and exhausting liquid coolant to the bipolar plate 12, as needed. It is appreciated that coolant may additionally or alternatively be provided to the bipolar plates 14 and 16.

Figure 2:
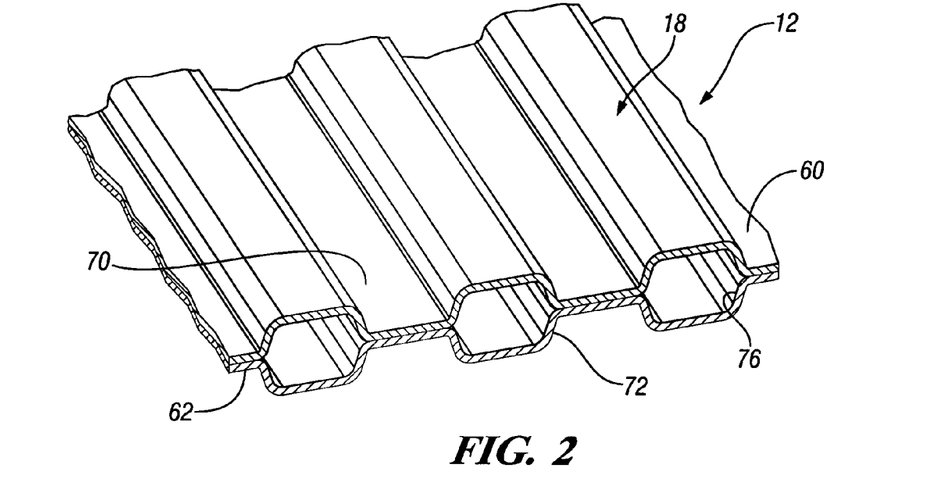
FIG. 2 is a sectional view of a portion of a bipolar plate of FIG. 1.

Turning now to FIG. 2, a fragment of the bipolar plate 12 is shown in greater detail to illustrate bonding of patterned regions of two metal sheets and the expansion of non-bonded portions into flow passages for fuel, oxidant and coolant.

The bipolar plate 12 generally includes a first and second plate 60, 62. The first and second plate 60, 62 are preferably formed of a conductive material such as aluminum alloy or stainless steel for example. The flow channels 18 of the bipolar plate 12 are further defined by an anode flow field 70 disposed on an outer surface of the first plate 60, a cathode flow field 72 disposed on an outer surface of the second plate 62 and a coolant flow field 76 disposed between the first and second plates 60, 62. In operation, the anode flow field 70 of the first plate 60 distributes the fuel to the anode face 8a of the MEA 8. Similarly, the cathode flow field 72 of the second plate 62 distributes the oxidant gas to the cathode face 10c of the MEA 10. Coolant is communicated through the coolant flow field 76 through the coolant plumbing 50 and 52.

Figure 3:
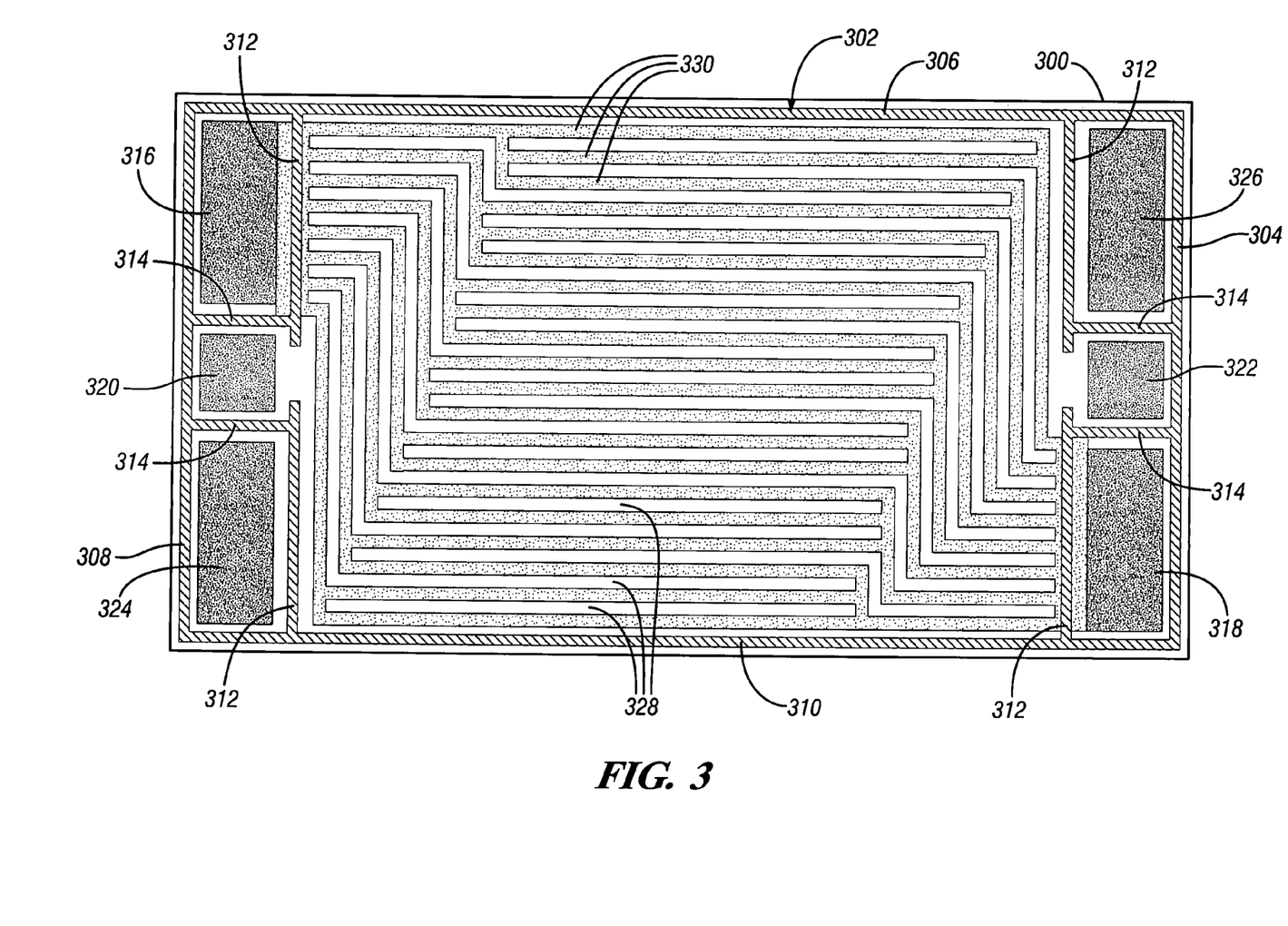
FIG. 3 is a plan view of a sheet metal blank for one side of an unformed bipolar plate member showing a pattern of applied bonding material (hatched bands) and a virtual pattern of air flow channels to be formed in the blank where the grey bands are the depressed (non-expanded) portions and the white bands are the expanded (raised) portions. In this design the air flow channels conduct air from the upper left side of the blank to its lower right side.
Figure 4:
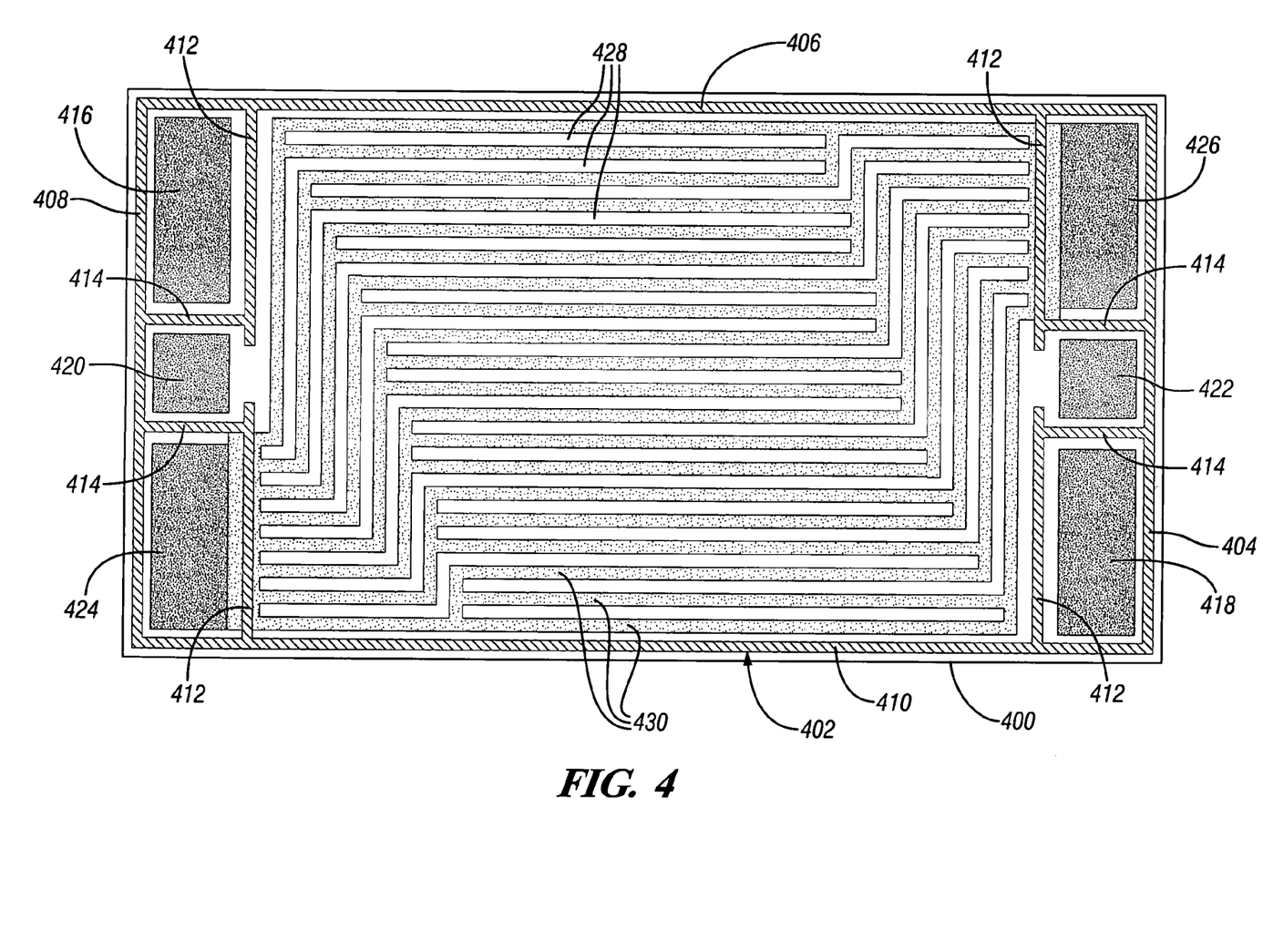
FIG. 4 is a plan view of a sheet metal blank for the other side of an unformed bipolar plate showing a matching pattern of soft bonding material as in the FIG. 3 blank and a complementary virtual pattern of hydrogen flow passages from the lower left side to its upper right side.

With reference now to FIGS. 3 and 4, a method of making a bipolar plate of the type depicted at 12 in FIG. 1 will be described in greater detail. The size and shape of each sheet member of a bipolar plate is designed based on the voltage and current delivery requirements of a stack of cell elements for a particular power device. The design of the flow channels for the fuel flow side and the oxidant flow side of the bipolar plate may be similar but they are usually distinct.

FIGS. 3 and 4 illustrate representative layouts or patterns of bands of bonding particles applied to a surface of a sheet metal blank for one or both of the sheets of a bipolar plate and patterns of air or fuel flow channels that are formed in the respective sheets. For example, FIG. 3 illustrates a patterned layout of bonding bands and air flow channels for a sheet metal blank 300 of thin gage (0.1 mm) of 316L stainless steel alloy, and FIG. 4 illustrates a pattern of hydrogen flow channels for a sheet metal blank 400 of the same material. Sheet metal blanks 300 and 400, with their schematic patterns of bonding bands and flow channels, are illustrated as separated cut-to-size rectangular pieces. But preliminary processing steps for bonding many bipolar plates in accordance with this invention may be performed on a large stainless steel sheet unwound from a roll of relatively soft annealed material and individual blank members later cut at a suitable stage of processing from the larger sheet stock.

In FIG. 3, the bipolar plate blank sheet member 300 for the air flow defining layer of a bipolar plate is illustrated in this example as rectangular. It is found that rectangular shaped plates are convenient for assembling into a fuel cell stack and for handling of the stack. Soft particles 302 of unalloyed or low alloy content aluminum are applied on a side of blank sheet member 300 to be bonded to bipolar plate blank sheet member 400. Considering the overall patterns illustrated in FIG. 3, the soft particles 302 would be applied to the bottom of the sheet blank 300.

The particles 302 are applied in a pattern of linear paths (hatched bands in FIG. 3) 304, 306, 308 and 310 around the edges of rectangular blank 300. Particles 302 are also applied in four sets of bands 312, 314. Thus, the total pattern of soft bonding particles 302 will be used to bond and seal the peripheral edges of a blank sheet member 300 to blank sheet member 400. The band pattern of soft particles 302 will also bond the blanks around areas where an air inlet 316, an air outlet 318, a coolant inlet 320 and a coolant outlet 322 may be cut out from blank 300. The respective inlet and outlet regions 316, 318, 320 and 322 are shown as darkened regions in FIG. 3 because they are ultimately cut out of the sheet material 300. Regions 324 and 326 of blank sheet 300 will overlie regions 424 and 426 of blank sheet 400 (FIG. 4) in which pieces will be removed for the admission of hydrogen and removal of waste products, for example excess hydrogen and water.

The patterns of bonding material and flow channels illustrated in FIGS. 3 and 4 are presented as though sheet metal blank 300 would be laid on top of the metal blank 400. Thus, soft bonding particles 302 would actually be applied to the bottom side of blank 300 in bonding bands 304, 306, 308, 310, 312 and 314. These bonding bands depicted in FIG. 3 would overlie the corresponding band regions 404, 406, 408, 410, 412 and 414 in FIG. 4. In the practice of the invention, bonding material may be applied to one or both of the sheet metal blanks making up a bi-polar plate.

Similarly, when blank 300 is placed over blank 400 for bonding, air inlet region 316 will overlie region 416 on blank 400, air outlet region 318 will overlie region 418, coolant inlet region 320 will overlie region 420, coolant outlet region 322 will overlie region 422, hydrogen inlet region 424 will underlie region 324 and hydrogen outlet region 426 will underlie region 326.

Obviously, the particular pattern in which the softer bonding particles are applied to conductive sheet material like sheet member 300 will depend on the design of the specific bipolar plate 12. The purpose of the application of bonding material is to provide suitable bonding and sealing regions between sheet member 300 and the complementary illustrative sheet member 400 for the formation of the fuel and oxidant flow channels (as will be described) and the subsequent operation of a fuel cell incorporating the bipolar plate (s). The bonding regions seal coolant flow between the sheets of the bipolar plate and separate fuel and oxidant flow on opposite outside surfaces of the sheets and plate.

The particulate bonding material is usually suitably applied to just one of the facing blank sheet members, such as in the patterns illustrated on sheet blank 300. However, it may be applied to both blanks 300 and 400 for greater thickness or for faster application, half to each sheet. Or a part of the bonding pattern may be applied to one blank and the rest of the bonding pattern applied to the other blank sheet member as a coating process expedient. One to two linear meters of coating material per plate may be required. The coating process may depend upon the bonding material and the pattern in which it is to be applied. The coating may be applied, for example, by rolling, printing or spraying using suitable masking to obtain a desired pattern of coating particles. A suitable thermal spray or plasma spray process would assure good particle to substrate bonding in the desired pattern. As stated, soft aluminum particles are a suitable coating material for stainless steel plates and for plates made of aluminum alloys.

Coating patterns for many sheet member blanks 300 and/or 400 may be prepared in a continuous process side-by-side on the surface of a large sheet from a roll of (316L alloy) stainless steel. And coating patterns for a like number of sheet member blanks 400 may be applied to a sheet surface unwound from a second roll of the stainless steel material. Sheets with coated patterns of soft bonding particles from each roll are then carefully placed in face-to-face relationship for roll bonding. The facing sheets are passed between one or more roller stands to deform the patterned bands or lines of soft aluminum particles into bonds that attach the sheets at the intended bonding sites. The heat generated in the mechanical deformation of the aluminum particles may also activate a chemical reaction between aluminum atoms and iron atoms at the bonding site forming intermetallic compounds that add to the strength of the bonds. The rolling process may be conducted at ambient temperature, or if desired, at a suitable elevated rolling temperature.

Bonded individual facing pairs of bipolar plate sheet material blanks 300 and 400 are now cut from the surrounding sheet material and they are prepared for expansion of selected non-bonded regions into channels for air flow on the outer surface of sheet material blank 300, channels for hydrogen flow on the outer surface of sheet material blank 400 with the resulting open space between their facing surfaces accommodating coolant flow. The expansion of these channel surfaces is controlled by the complementary forming surfaces 502 and 504 of the two-piece die 500 shown in FIG. 5.

In FIGS. 3 and 4, the white bands 328, 428 represent regions of the sheet material blanks 300, 400 that will be expanded and deformed out of the plane of the sheet material and against machined-out bands 506, 508 (see FIG. 5) of forming surfaces 502 and 504 in the fabrication of the bipolar plate. The grey lines or bands 330, 430 in FIGS. 3 and 4 represent surfaces of sheet material blanks 300 and 400 that will be restrained from expansion by un-relieved contact bands 510 and 512 of die surfaces 502, 504. It is to be understood that the bands 328, 330, 428 and 430 are included in FIGS. 3 and 4 to illustrate the patterns of the flow channel shaping of bonded sheet metal blanks 300 and 400 into a bipolar plate assembly. But such lines or bands are not necessarily marked on a metal blank 300, 400 in the manufacturing process until the blanks have been bonded and expanded in two-piece die 500. In this description the bands merely indicate where the channels will be formed in the bonded sheet blanks 300 and 400.

Again, for illustration, the grey bands 330 and 430 represent the base of the air channels on the back side of blank 300 (as viewed in FIG. 3) and the base of the hydrogen channels on the back side of blank 400 (as viewed in FIG. 4). The sides of these respective flow channels are defined by the outside surfaces of expanded paths 328 and 428. The tops of the outer flow channels of a bipolar plate made from sheet metal blanks 300 and 400 will be confined by primary current collector sheet, such as those illustrated at 36 and 38 in FIG. 1.

Figure 5:
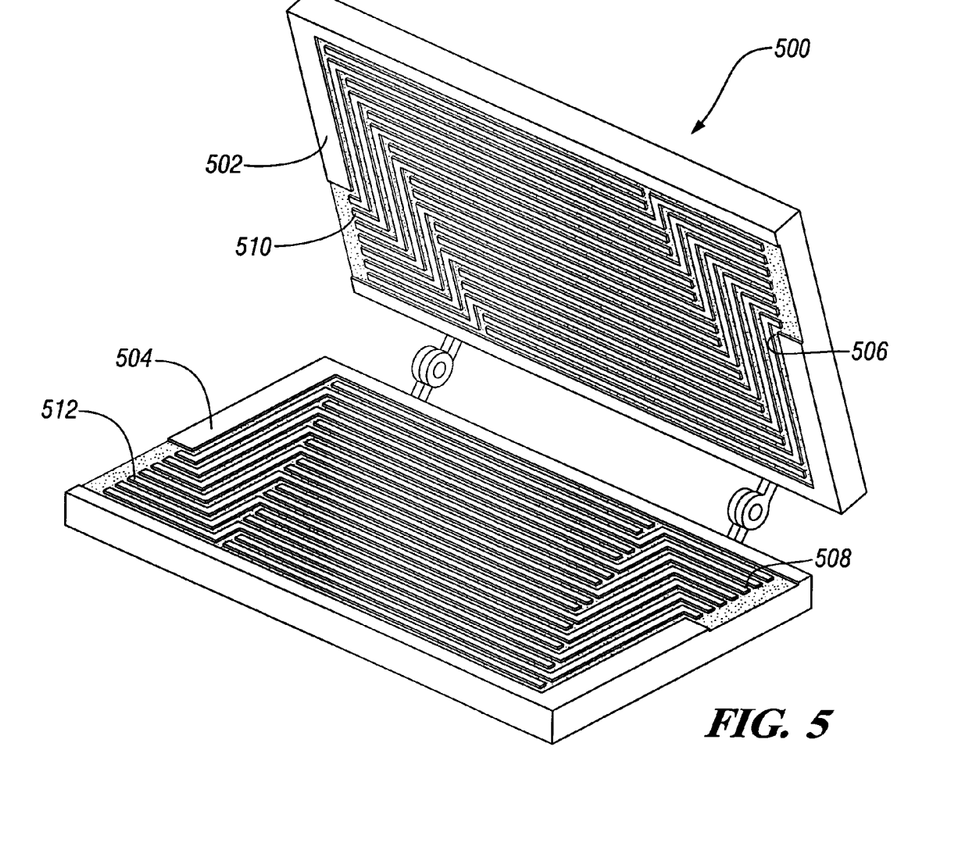
FIG. 5 is a perspective view of a complementary die set for the expansion of the air and hydrogen flow passages on the sheets depicted in FIGS. 3 and 4.

When the selected paths 328 and 428 of bonded blanks 300 and 400 have been expanded in die 500 there remain paths between blanks 300 and 400 for the flow of a non-conductive coolant between the plates. Coolant enters at region 320 and exits at region 322. Suitable provision is made at region 316 of the bonded and expanded blanks for the admission of air to flow along paths 330 and exit at region 318. Similarly, provision is made at region 424 of the bonded and expanded sheets for the admission of hydrogen to flow along paths 430 and out of the bipolar plate at region 426.

Figure 6A:
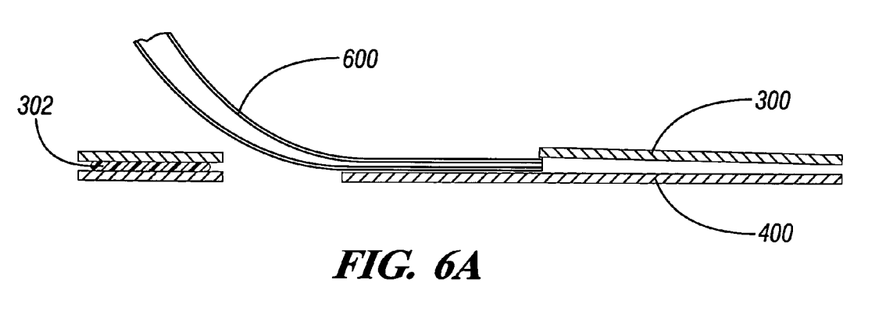
FIGS. 6A and 6B are schematic views of a fluid injection nozzle for the injection of a pressurized expansion fluid between non-bonded portions of the sheets of the bipolar plate.
Figure 6B:
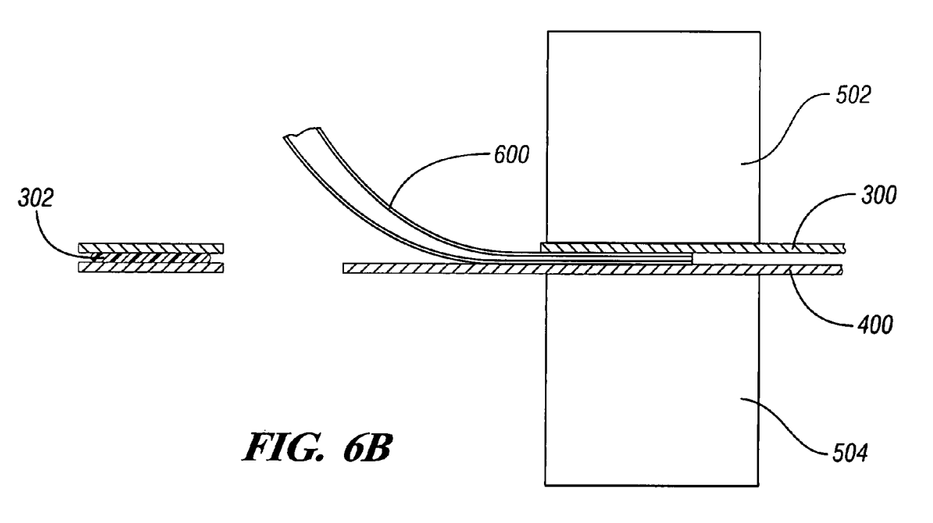

Forming of the face-to-face bonded blanks 300 and 400 is accomplished by placing the bonded blanks 300-400 between complementary die surfaces 502, 504. Referring to FIGS. 6A and 6B, a thin nozzle 600 is inserted between sheet metal blanks 300 and 400 such as at regions 320 and 322. Material has been trimmed from blank 300 at, for example, region 320 and from blank 400 at region 420 for eventual coolant admission. Nozzle 600 is inserted after blanks 300 and 400 have been placed in die 500. High pressure fluid is then delivered through the nozzle to expand the white band regions (328 in FIG. 3 and 428 in FIG. 4) into the machined-out bands 506 and 508 of die surfaces 502 and 504. This expansion process shapes the bonded blanks 300 and 400 into channel defining bipolar plates such as that illustrated at 12 in FIG. 1.

Figure 7:
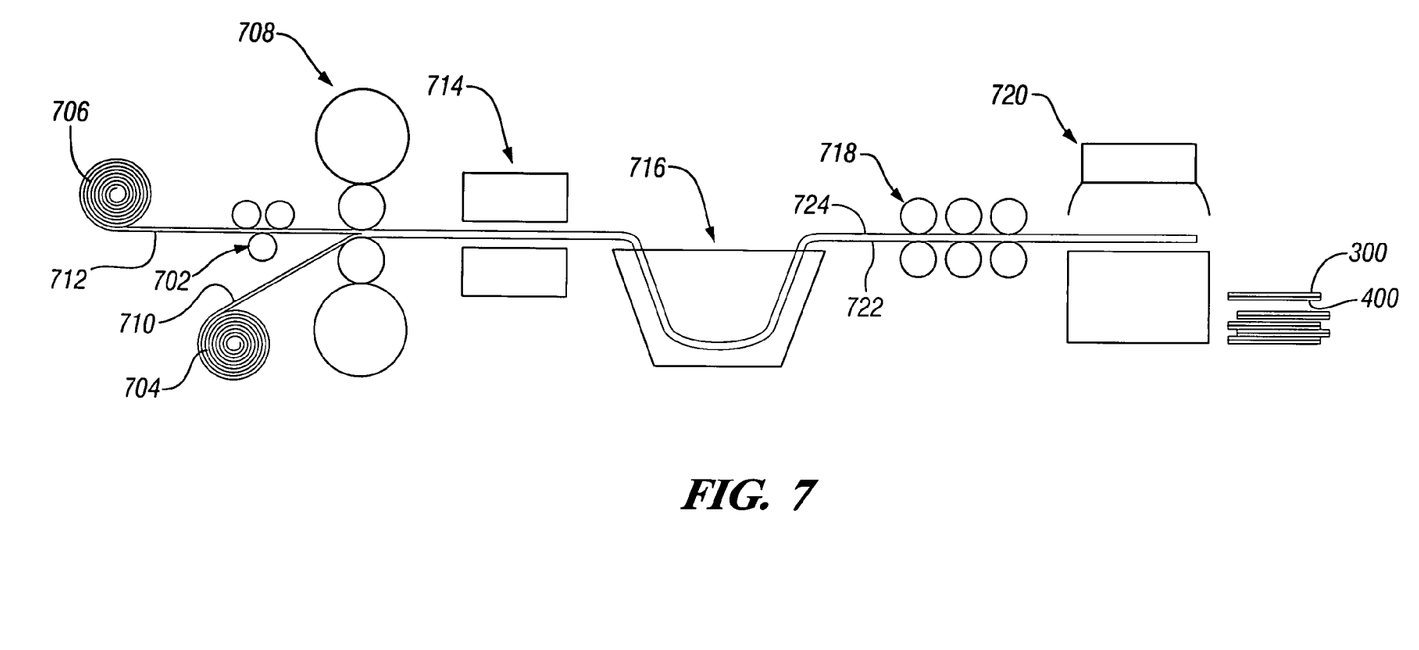
FIG. 7 is a schematic flow diagram of the processing and bonding of blank sheet material for expansion into a bipolar plate.

A preferred embodiment of the sheet coating and bonding process is now summarized by reference to FIG. 7. Rolls 704, 706 of a suitable sheet material, such as 316L stainless steel alloy, are selected. Preferably the cold-rolled material has been annealed to maximize its formability. In this example, the relatively soft aluminum particle bonding material (302 in FIG. 3) is placed in desired patterned regions onto the sheet of material using a patterned roller applicator 702. In this example coating material is applied only to the lower side 712 of roll 706 for blanks 300.

Following the application of bonding material to surface 712 by applicators 702 (or by any suitable process such as thermal spray coating) roll 706 (for blanks 300) along with a roll 704 of complementary sheet (for blanks 400) with facing side 710 is introduced into a rolling mill 708 for the pattern bonding of the facing sheets. The action of rolling mill 708 deforms the soft aluminum particulate coating material to form a metallurgical bond in the coated regions thereby joining the facing sides 710 and 712 at the patterned locations of the bonding material. The joined sheets are annealed with an annealing device 714 and then cleaned through a continuous clean and rinse bath 716.

A coating of electrically conductive material to promote electrical conductivity of the stainless steel is applied through a roll coating apparatus 718 on the outer surfaces 722, 724 of the sheets. The sheets are cut by a blanking press 720 into bonded facing blanks 300/400 as described above. A paired set of blanks 300/400 are then placed into the die (500 as illustrated in FIG. 5) having the flow channel defining surfaces 502 and 504 incorporated in the complementary and opposing die members. Fluid is introduced between the pattern bonded blanks 300/400 causing them to expand against the relieved bands 506, 508 of forming surfaces 502 and 504 of die 500.

The newly formed bipolar plates (like bipolar plates 12 in FIG. 1) are trimmed and holes including header apertures are placed in desired locations. The bipolar plates are ready for attachment of piping or gating for the delivery of fuel, oxidant and coolant to the proper faces and interior of the finished plate. The finished plate is then assembled with the other fuel cell elements, as illustrated in FIG. 1, and to form a stack of many plates, current conductors and membrane electrodes as required for the specified power capacity of the device. The elements are pressed together under suitable clamping force for the structural integrity of the unit.

It is appreciated that some of the steps outlined in the preceding discussion may be modified or placed in an alternative sequence. For example the application of the conductive coating may alternatively be applied before the roll bonding step. In addition, header apertures may alternatively be formed during the fluid expansion step in die 500. Accordingly, die extensions may be incorporated into the die 500 that encourage headers to form in the header portion of the bipolar plate 12 upon fluid expansion.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

The invention claimed is:

1. A method of making a current collector plate of the type comprising two sheets of metallic material having a predetermined pattern of bonded facing surface portions and non-bonded facing surface portions, the current collector plate further comprising fluid flow channels formed in the non-facing surfaces of the sheets, said method comprising:
    applying a metallic bonding material to the facing surface of at least one of the sheets in the predetermined pattern, the metallic bonding material being softer than the metallic material of the sheets;
    pressing the sheets together between rollers to deform the metallic bonding material under roll bonding pressure so that facing portions are bonded by the deformed bonding material in the pre-determined pattern;
    placing the sheets with bonded facing portions between opposing forming surfaces, the opposing forming surfaces having (i) surface portions engaging locations of non-facing surfaces of the sheets for preventing expansion at the engaged sheet locations and (ii) relieved portions for expansion of non-engaged portions of the sheets into the fluid flow channels; and
    injecting fluid between the sheets to expand non-facing sides of non-bonded portions of the sheets into the relieved portions of the opposing forming surfaces to form the fluid flow channels.

2. The method of making a current collector plate as recited in claim 1 in which the two sheets are each of a metallic material selected from the group consisting of stainless steel alloys and aluminum alloys and the metallic bonding material consists essentially of aluminum.

3. A method for making a current collector plate of the type comprising two sheets of metallic material having peripheral edge portions and having a predetermined pattern of bonded facing surface portions and non-bonded facing surface portions; the non-facing surfaces of the sheets each having fluid flow channels for an electrochemical device, the channels on one non-facing surface being for a fuel for the device and the channels on the other non-facing surface being for an oxidant for the fuel; said method comprising:
    applying a metallic bonding material to the facing surface of at least one of the sheets in the predetermined pattern, the pattern including said bonding material at or adjacent the peripheral edge portions of the sheets, the metallic bonding material being softer than the metallic material of the sheets;
    pressing the sheets together between rollers to deform the metallic bonding material under roll bonding pressure without substantial deformation of the sheets so that facing portions are bonded by the deformed bonding material in the pre-determined pattern;
    placing the sheets with bonded facing portions between opposing forming surfaces, the opposing forming surfaces having (i) surface portions engaging locations of non-facing surfaces of the sheets for preventing expansion of the sheets at the engaged sheet locations and (ii) relieved portions for expansion of non-engaged portions of the sheets into the fluid flow channels; and
    injecting fluid between the sheets to expand non-facing sides of non-bonded portions of the sheets into the relieved portions of the opposing forming surfaces to form the fluid flow channels.

4. The method for making a current collector as recited in claim 3 comprising applying a metallic bonding material to the facing surface of at least one of the sheets in the predetermined pattern, the pattern including said bonding material at or adjacent the peripheral edge portions of the sheets and at inlet and outlet portions for the fluid channels.

5. The method of making a current collector plate as recited in claim 3 in which the two sheets are each of a metallic material selected from the group consisting of stainless steel alloys and aluminum alloys, and the metallic bonding material consists essentially of aluminum.

6. The method of making a current collector plate as recited in claim 4 in which the two sheets are each of a metallic material selected from the group consisting of stainless steel alloys and aluminum alloys, and the metallic bonding material consists essentially of aluminum.

* * * * *